(12) United States Patent
Pfister et al.

(10) Patent No.: US 8,317,398 B2
(45) Date of Patent: Nov. 27, 2012

(54) LINEAR MOTION DEVICE COMPRISING A DEFLECTION ASSEMBLY HAVING A SINGLE DEFLECTION PASSAGE

(75) Inventors: Steffen Pfister, Niederwern (DE); Bernhard Keller, Kaisten (DE)

(73) Assignee: Robert Bosch GmbH, Stuttgart (DE)

( * ) Notice: Subject to any disclaimer, the term of this patent is extended or adjusted under 35 U.S.C. 154(b) by 501 days.

(21) Appl. No.: 12/694,950

(22) Filed: Jan. 27, 2010

(65) Prior Publication Data
US 2010/0209027 A1  Aug. 19, 2010

(30) Foreign Application Priority Data
Feb. 16, 2009 (DE) .......................... 10 2009 009 006

(51) Int. Cl.
*F16C 29/06* (2006.01)
*F16C 29/04* (2006.01)
(52) U.S. Cl. ............................. 384/43; 384/49
(58) Field of Classification Search ............... 384/7, 43, 384/44, 45, 49, 50, 56, 57
See application file for complete search history.

(56) References Cited

U.S. PATENT DOCUMENTS

| | | | |
|---|---|---|---|
| 2,672,379 A | 3/1954 | McWey | |
| 2,785,934 A * | 3/1957 | Alderstam et al. | 384/44 |
| 2,998,286 A * | 8/1961 | Jarund | 384/45 |
| 3,044,835 A | 7/1962 | Hurd | |
| 3,304,133 A * | 2/1967 | Strassberg | 384/44 |
| 3,845,993 A * | 11/1974 | Schiler | 384/45 |
| 4,632,573 A * | 12/1986 | Itoh | 384/43 |
| 4,869,600 A * | 9/1989 | Tonogai | 384/43 |
| 6,371,648 B1 * | 4/2002 | Kato et al. | 384/45 |
| 2007/0189646 A1 | 8/2007 | Koeniger et al. | |

FOREIGN PATENT DOCUMENTS

| | | |
|---|---|---|
| DE | 30 23 978 | 1/1982 |
| DE | 10 2006 007 067 | 8/2007 |
| EP | 0 463 858 | 1/1992 |
| JP | 64-12129 | 1/1989 |
| JP | 2003166530 A * | 6/2003 |
| WO | 03/046395 | 6/2003 |

* cited by examiner

*Primary Examiner* — Thomas R Hannon
*Assistant Examiner* — Adam D Rogers
(74) *Attorney, Agent, or Firm* — Michael J. Striker

(57) ABSTRACT

A linear motion device has a first assembly and a second assembly which is linearly movable relative to the first assembly, in which at least one first rolling surface which extends in a longitudinal direction is provided on the first assembly, the first rolling surface being located opposite a second rolling surface provided on the second assembly, and in which a row of rolling elements is located between the first and second rolling surfaces, and in which a return passage that is substantially parallel to the first rolling surface is provided in the first assembly, the return passage being connected at either end via a curved deflection passage to the first rolling surface such that rolling elements are transferred, thereby enabling the rolling elements to circulate endlessly, and in which the first assembly includes at least one deflection assembly that may be installed as a whole, and that includes a single deflection passage, and the return passage is provided directly and completely in a separate first body of the first assembly, and the deflection assembly is fastened to the first body via a single, separate fastening bolt that is installable from one side, the fastening bolt being located in the region of the center of curvature of the assigned, curved deflection passage.

10 Claims, 11 Drawing Sheets

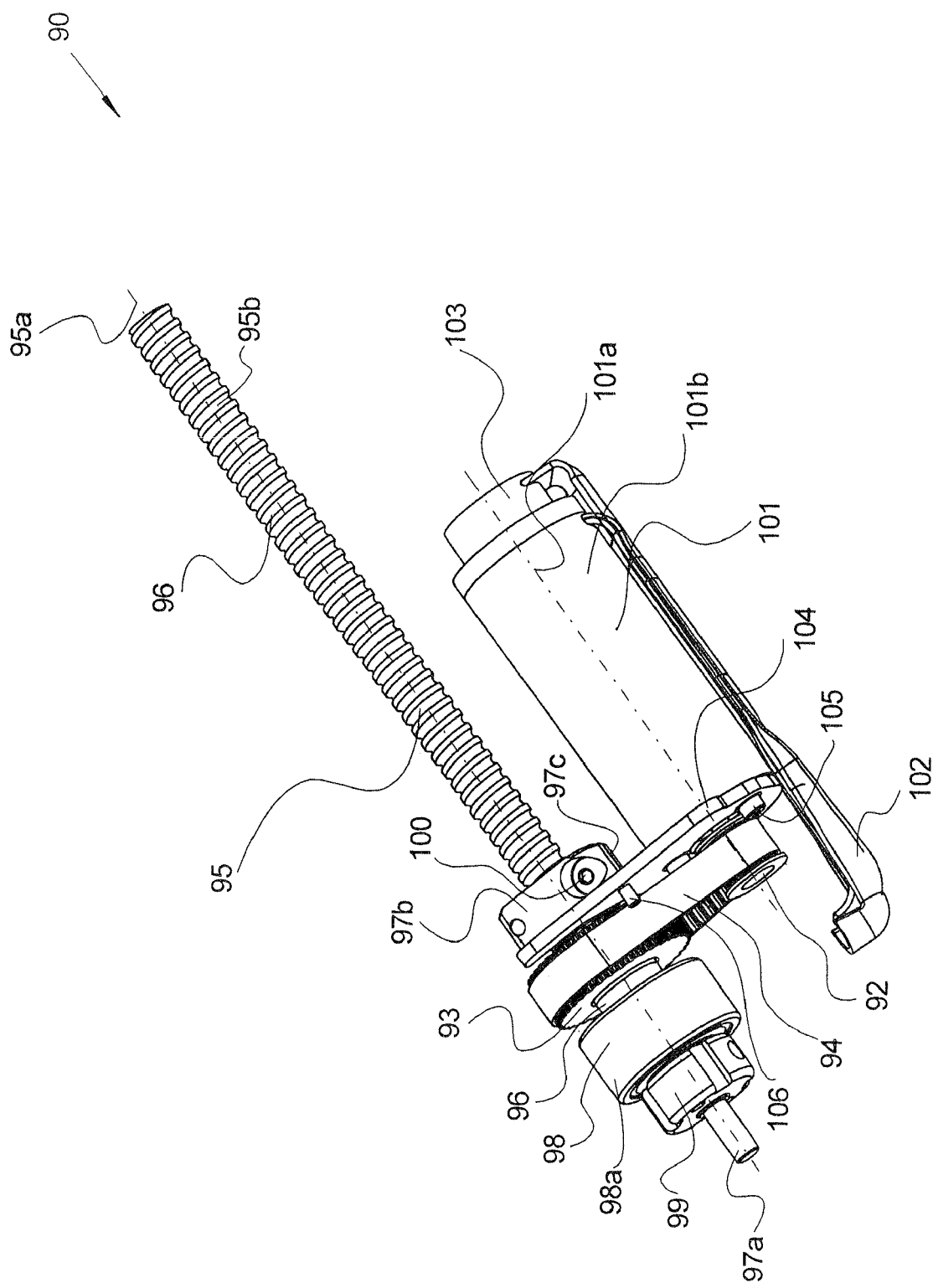

LINEAR MOTION DEVICE COMPRISING A DEFLECTION ASSEMBLY HAVING A SINGLE DEFLECTION PASSAGE

CROSS-REFERENCE TO A RELATED APPLICATION

The invention described and claimed hereinbelow is also described in German Patent Application DE 10 2009 009 006.1 filed on Feb. 16, 2009. This German Patent Application, whose subject matter is incorporated here by reference, provides the basis for a claim of priority of invention under 35 U.S.C. 119(a)-(d).

BACKGROUND OF THE INVENTION

The present invention relates to a linear motion device. Linear motion devices of that type are known, e.g., as bearing rail guides or roller rail guides, in which case the first assembly is the guide carriage, and the second assembly is the guide rail. However, the present invention is also usable in a linear module, in which a linear guide having an assigned drive device is integrated to form one assembly.

JP 64-12129 A makes known a linear motion device in the form of a roller rail guide. According to FIGS. 1a and 3a of JP 64-12129 A, the linear motion device includes a first assembly in the form of a guide carriage 2, and a second assembly in the form of a guide rail 5, which are linearly movable relative to one another. A total of four first rolling surfaces 15 is provided on the first assembly, each of which is opposite a second rolling surface 11a; 11b on the second assembly. A row of roller-shaped rolling elements that may circulate endlessly in the first assembly is situated between the aforementioned rolling surfaces. For this purpose, a total of four return passages that are parallel to the first rolling surfaces is provided in the first assembly. The return passages are connected via a curved deflection passage such that rolling elements are transferred. The deflection passage and the return passage are each provided in a deflection assembly that may be installed as a whole on first body 16, the deflection assembly being accommodated in bores 14 of the body.

The deflection assembly is depicted in greater detail in FIG. 3b of JP 64-12129 A. It includes two deflection parts 20u; 20l which are separated from one another in a parting plane that extends through the midpoint trajectory of the circulating rolling elements, and so each deflection part is designed in the shape of a half shell. Each deflection part includes a first section 1 in which curved deflection channel 22 is provided, and a tubular second section 18 in which the return passage is provided.

In order to fasten the deflection assembly to the first body, two mutually assigned deflection parts are assembled to form one deflection assembly, the tubular section of which is slid into the assigned bore of the first body. The deflection assembly is therefore retained by the tubular section on the first body. The disadvantage of this embodiment is that a great deal of space is required in the longitudinal direction in front of and behind the first body in order to install the deflection assembly. This space is typically unavailable, in particular in linear modules.

A linear module is known, e.g., from DE 10 2006 007 067 A1. In that publication, allowances are made for the tight spaces by the fact that the deflection assembly may be fastened to the table assembly only from the bottom. Accessibility from the top is still required, however, so that the rivet pins (no. 34 in FIG. 2 of DE 10 2006 007 067 A1) may become plastically deformed in order to fasten the deflection assembly to the table. Moreover, DE 10 2006 007 067 A1 is equipped with an "open" return, in which an open return passage on the first body is covered by the deflection assembly. The result is much more noise as compared to the closed return mentioned in JP 64-12129 A since the returning rolling elements strike plastic on the deflection assembly and cause it to oscillate, thereby generating sound. The fact that the cover of the return channel is provided on the deflection assembly has the disadvantage that the latter may only be used in conjunction with a specified length of the first rolling surface. The deflection assembly may therefore not be used in different embodiments of linear motion devices that include first rolling surfaces having different lengths. The related deflection assemblies may therefore be manufactured only in small quantities and are therefore expensive. This is unfavorable in particular since the related plastic injection molding tools are very expensive, and are particularly suited for use to produce large quantities.

SUMMARY OF THE INVENTION

The object of the present invention is to provide a linear motion device, the deflection assembly of which may even be installed in tight spaces. In particular, it should be possible to install the deflection assembly even when the installation location is only accessible from one side. Moreover, it should also be possible to create the assigned fastening contours only from this one installation side. In addition, the deflection assembly should be usable in many different embodiments of linear motion devices. Furthermore, the linear motion device should be particularly quiet.

According to the independent claim, this object is attained by the fact that the return passage is provided directly and completely in a separate first body of the first assembly, in which case the deflection assembly is fastened to the first body via a single, separate fastening bolt that is installable from one side, the fastening bolt being located in the region of the center of curvature of the assigned, curved deflection passage. The return passage is formed entirely in the first body, i.e., in the form of a closed return, in order to obtain the desired low noise level. It is simultaneously provided in the first body in order to eliminate the return tube described in JP 64-12129 A. Via this measure, the deflection assembly may now also be used in conjunction with rolling surfaces having different lengths. Another fastening is required as a result. It is realized using a single, separate fastening bolt that is installable from one side. A screw bolt is envisioned, in particular, for use in this case. It may be screwed in from one side, and the assigned thread may be cut on this same side. A blind rivet may also be used, however. Likewise, its fastening bore may be bored from the installation side. The purpose of using a single fastening means is to keep assembly simple. The fastening bolt must therefore be sufficiently strong. The space required for this is available in the center of curvature of the curved deflection channel.

The deflection assembly may include a first and second deflection part, the parting plane of which is defined by the midpoint trajectory of the rolling elements in the deflection passage, in which case the fastening bolt extends through both deflection parts and is situated perpendicularly to the parting plane. The deflection assembly must be divided into two deflection parts so that they may be designed largely free of undercuts, thereby making it possible to manufacture them using appropriate plastic injection molds. Via the proposed placement of the fastening bolt, the deflection assembly is fastened to the first body, and the first and second deflection parts are held together by the fastening bolt.

The deflection assembly may be accommodated in a deflection recess located on the side of the first body, the deflection recess being adapted to the deflection assembly such that the deflection assembly is substantially entirely prevented from rotating. Given that the deflection assembly is installed on the first body only via a single fastening bolt, there is a risk that it will rotate about the axis of the fastening bolt. This risk is ruled out via the deflection recess. It should be noted that it is definitely desirable for the deflection assembly to be able to rotate slightly in the deflection recess in order to compensate for tolerances. The deflection assembly is preferably accommodated in the deflection recess such that it is fully recessed and is therefore protected against damage. Given that the deflection recess is located on the side of the first body, it may be formed on the aforementioned installation side, e.g., via milling.

The first rolling surface may be provided on a separate, first rolling surface part that is supported on the first body, the first rolling surface part extending in the longitudinal direction beyond the first body and thereby engaging in the first deflection part and the assigned second deflection part. It is known, e.g., from aforementioned publication DE 10 2006 007 067 A1, to design the rolling surfaces of a linear motion device on a separate rolling surface part that is typically composed of hardened roller bearing steel. The first body may therefore be made of a softer material, such as aluminum, which is substantially less expensive to machine. Via the proposed engagement of the rolling surface part in the deflection assembly, it is ensured that the first rolling surface transitions substantially projection-free into the curved deflection passage, thereby ensuring smooth running of the rolling elements.

The rolling elements may be balls, and the first rolling surface part has a V-shaped cross section that includes a first V-leg and a second V-leg, the first V-leg engaging in the first deflection part, and the second V-leg engaging in the second deflection part. The use of spherical rolling elements in conjunction with a V-shaped rolling surface part is known from DE 10 2006 007 067 A1. The purpose of the proposed engagement in both deflection parts is to attain a particularly good orientation between the first rolling surface and the curved deflection passage, it being possible to manufacture the individual deflection parts simultaneously and substantially projection-free.

A separate transfer part may be provided that engages in the curved deflection passage and in the adjacent return passage, the transfer part including a deformable passage that connects the deflection passage to the return passage. The purpose of the transfer part is to compensate for tolerance-induced displacement between the curved deflection passage and the return passage. This is accomplished via the deformable passage which may deform in order to compensate for the aforementioned displacement. Since the deformation is minimal, the interference in the running of the rolling elements is minimal. The engagement of the transfer part in the curved deflection passage and the return passage may easily be designed such that no projections exist that interfere with the running of the rolling elements.

At least one separate, first lubricating oil storage body may be provided that has a constant cross sectional shape, and is enclosed by the first deflection part and the assigned second deflection part, the first lubricating oil storage body extending via at least one application section into the assigned deflection passage, thereby enabling it to establish lubricating contact to the rolling elements. The first lubricating oil storage body may be, e.g., an open-cell foam or a felt. The first lubricating oil storage body is preferably manufactured, cost-favorably, of a panel-type material using water-jet cutting, and so the oil storage body has a constant cross-sectional shape. The problem typically exists that it is not possible to form a suitable application section using water-jet cutting since the application section is substantially smaller—narrower, in particular—than the storage section. In the deflection assembly according to the present invention, however, it is possible to accommodate only one lubricating oil storage body having a limited width that substantially corresponds to the diameter of the rolling body. It is therefore possible to easily form the application section on the oil storage body merely by using water-jet cutting. In addition, the proposed design is particularly cost-favorable since the chamber that is required for the first lubricating oil storage body may be created in the deflection assembly at no additional cost.

The first lubricating oil storage body may be directly connected to a separate, second lubricating oil storage body in a lubricant-transferring manner, the second lubricant storage body having a constant cross-sectional shape that is adapted to the cross-sectional shape of the second rolling surface and that touches the second rolling surface; the cross-sectional planes of the first and second lubricating oil storage bodies are oriented perpendicularly to one another. The second lubricating oil storage body is used to lubricate the second rolling surface, thereby simultaneously functioning as a stripper that wipes foreign objects off of the second rolling surface and prevents them from coming in contact with the rolling elements. These functions should also be realized via a lubricating oil storage body that is cut out of a panel-type material and therefore has a constant cross-sectional shape. This is possible only when two lubricating oil storage bodies are present that are oriented perpendicularly to one another. Via the mutual contact of the lubricating oil storage bodies, the entire supply of lubricating oil is made available equally for both lubricating functions, and is supplied as needed. The service life of the lubricating device is increased as a result.

A stripper plate may be formed as a single piece exclusively with the first deflection part, which is situated with slight, equidistant clearance from the second rolling surface, the stripper plate supporting the second lubricating oil storage body against bending. The main purpose of the stripper plate is to remove coarse contaminants from the second rolling surface. The stripper plate is provided on only one of the two deflection parts, so that it may be adapted to the second rolling surface as exactly as possible. This would not be reliably ensured in the case of a two-component design, due to the expected joint displacement between the two halves of the stripper plate. Furthermore, the stripper plate is situated such that it has a stabilizing effect on the second lubricating oil storage body while it performs the stripping function. The second lubricating oil storage body is preferably composed of open-cell foam and therefore has only minimal stiffness. At the same time, it rubs via a large contact surface against the second rolling surface, thereby producing relatively great frictional forces that may cause the second lubricating oil storage body to bend. This bending may be prevented by the stripper plate.

A lifting projection may be provided exclusively on the first deflection part, via which the rolling elements may be lifted away from the second rolling surface and transferred to the assigned deflection passage. The lifting projection must be adapted to the second rolling surface as exactly as possible so that it may lift the rolling elements off of the second rolling surface with minimal interference. This may be easily ensured given that the lifting projection is formed as a single piece on only one of the deflection parts. In an alternative two-component design that is likewise feasible, and in which half of the lifting projection is provided on one of the two deflection parts, it is expected that joint displacement would occur, however.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows a perspective view of the drive assembly of the linear motion device depicted in FIG. 1;

DESCRIPTION OF THE PREFERRED EMBODIMENTS

Figure 1:
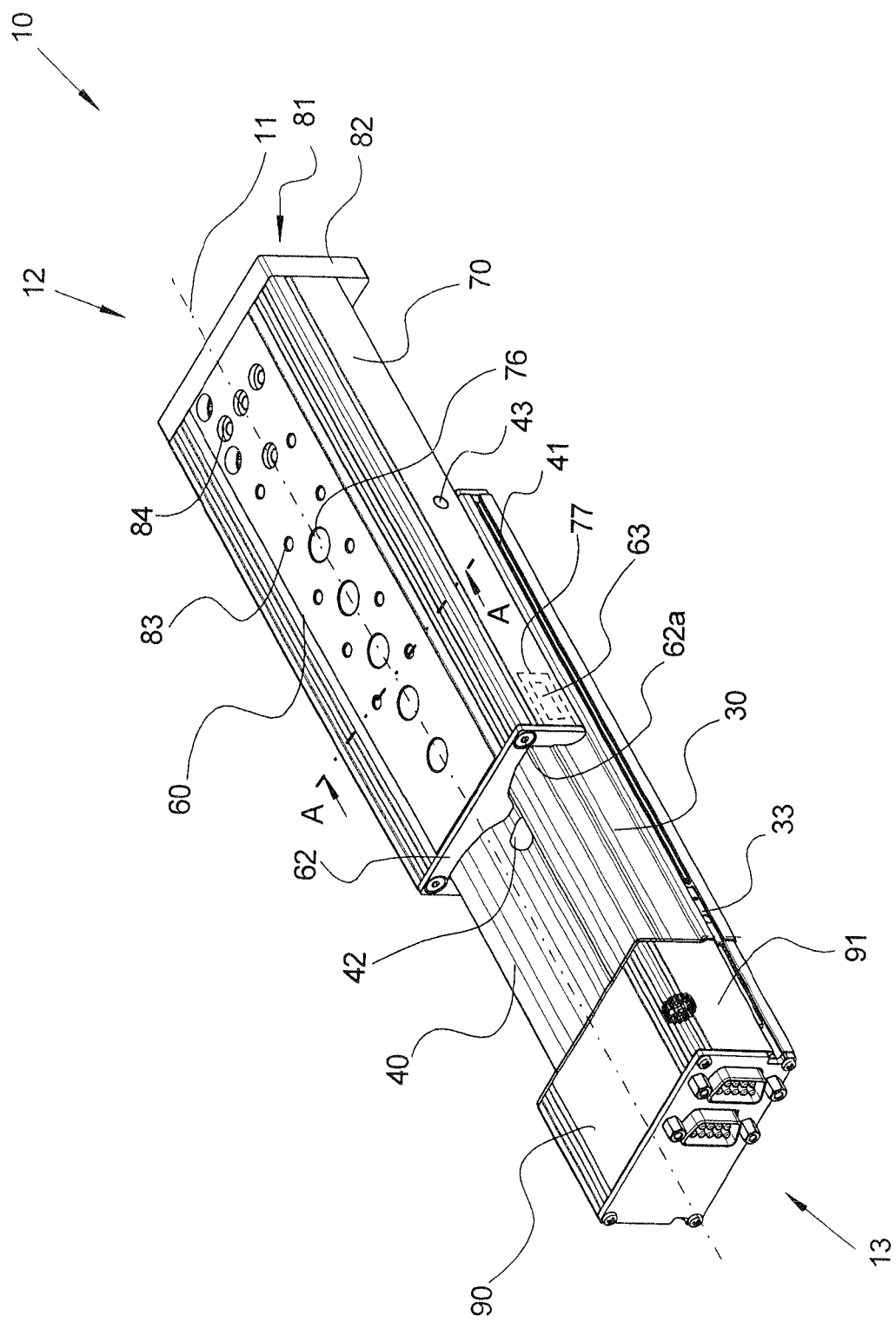
FIG. 1 shows a perspective view of a linear motion device according to the present invention.

FIG. 1 shows a linear motion device 10, according to the present invention, in the form of a linear module. The linear motion device includes a first assembly 30 in the form of a housing that extends in a longitudinal direction 11. Furthermore, a second assembly 60 is provided in the form of a table part, which is movable longitudinally relative to first assembly 30. Second assembly 60 includes a second body 70 which is composed of aluminum, on front end 12 of which a fastening plate 82 is provided that is always located ahead of the front end of first assembly 30 regardless of the position of the second assembly. Fastening plate 82 is a flat panel composed of aluminum, which, similar to second body 60, includes various fastening means 81 in the form of threaded bores 83 and through bores 84, thereby enabling fastening means 81 to be fastened to a higher-order assembly (not depicted).

First assembly 30 includes a first body 40 which is likewise composed of aluminum. Through bores 42 are provided, as fastening means, in first body 40, thereby enabling first assembly 30 to be fastened to a lower-order assembly (not depicted). Since fastening means 42 of first assembly 30 are partially covered by second assembly 60, various continuous installation bores 76 are provided in the latter, via which screw bolts may be inserted into through bores 42 in first assembly 30.

A stripper plate 62, which is composed of steel sheet, is installed via fastening screws 62a on rear end 13 of second body 70. Stripper plate 62 is situated close to first body 40 with minimal clearance, thereby substantially preventing foreign objects from entering the space between first assembly 30 and second assembly 60. In addition, stripper plate 61 is used to close a magnet recess 77 located in the end face (depicted in a basic schematic manner) of second body 70, in which a permanent magnet 63 (depicted in a basic schematic manner) is accommodated. The magnetic field of permanent magnet 63 may be detected by one or more sensors 33 which may be installed in any longitudinal position in an undercut sensor groove 41 which extends in longitudinal direction 11. As a result, one or more positions of second assembly 60 relative to first assembly 30 may be detected by a higher-order control device (not depicted).

A drive assembly 90 is provided at rear end 13 of first body 40, using which second assembly 60 may be moved relative to first assembly 30. However, FIG. 1 only shows gearbox housing 91 of drive assembly 90 which will be explained in greater detail with reference to FIG. 4.

Figure 2:
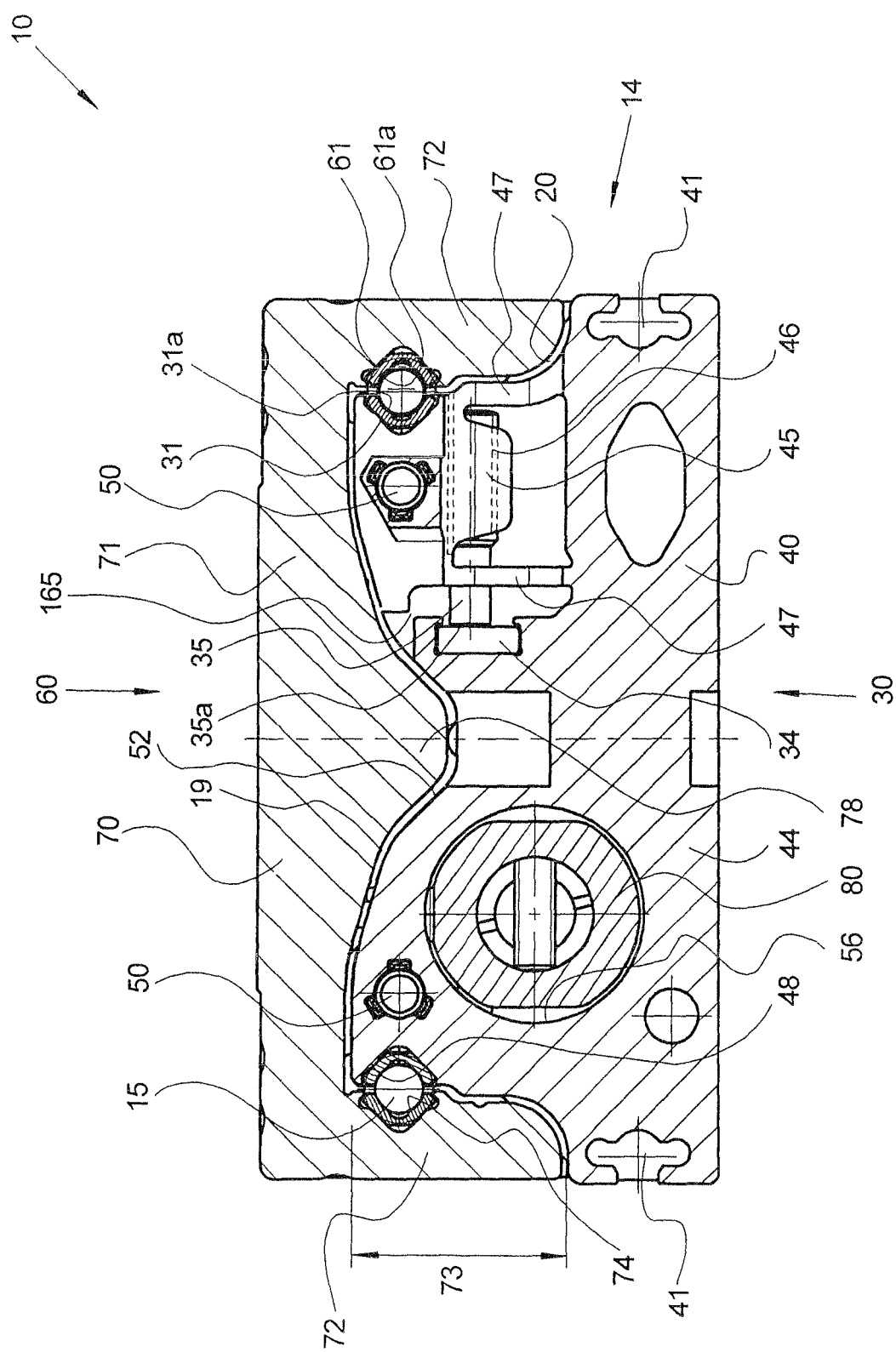
FIG. 2 shows a cross section of the linear motion device depicted in FIG. 1; the cutting plane is labeled A-A in FIG. 1.

FIG. 2 shows a cross section of linear motion device 10. Shown is the entire U-shaped design of second body 70 including a base 71 and two U-legs which extend perpendicularly away therefrom. A second rolling surface part 61 is provided on each of the opposite inner sides of the U-leg. Second rolling surface part 61 is a profiled element that extends in the longitudinal direction, and that has a constant, substantially V-shaped cross section. Second rolling surface part 61, which is composed of hardened roller bearing steel, is provided on the inner side of the V shape with a second rolling surface 61a that is designed with a cross-sectional profile in the shape of a Gothic arch, and so spherical rolling elements 15 touch second rolling surface 61a at two points in a known manner. A first rolling surface part 31, which is designed identically to second rolling surface part 61 except in terms of length, is situated opposite second rolling surface part 61. Rolling elements 15 may therefore roll between first rolling surface 31a and second rolling surface 61a, and so second assembly 60 is supported on first assembly 30 in a longitudinally moveable manner. First body 40 and second body 70 are each fabricated from a raw part that is manufactured of aluminum via extrusion, and the cross-sectional profile formed during extrusion largely corresponds to the cross-sectional profile shown in FIG. 2. Reference is made below to the geometries that are attained via machining after the extrusion process is carried out. Reference is made mainly to accommodating recesses 48; 74, in which first rolling surface parts 31 and second rolling surface parts 61 are accommodated in a form-locked manner. Accommodating recesses 48; 74 must be adapted exactly to assigned rolling surface parts 31; 61, and they must be very straight so that the rolling guidance functions in a stiff and accurate manner. They were therefore formed in the related raw part via milling.

Figure 7:
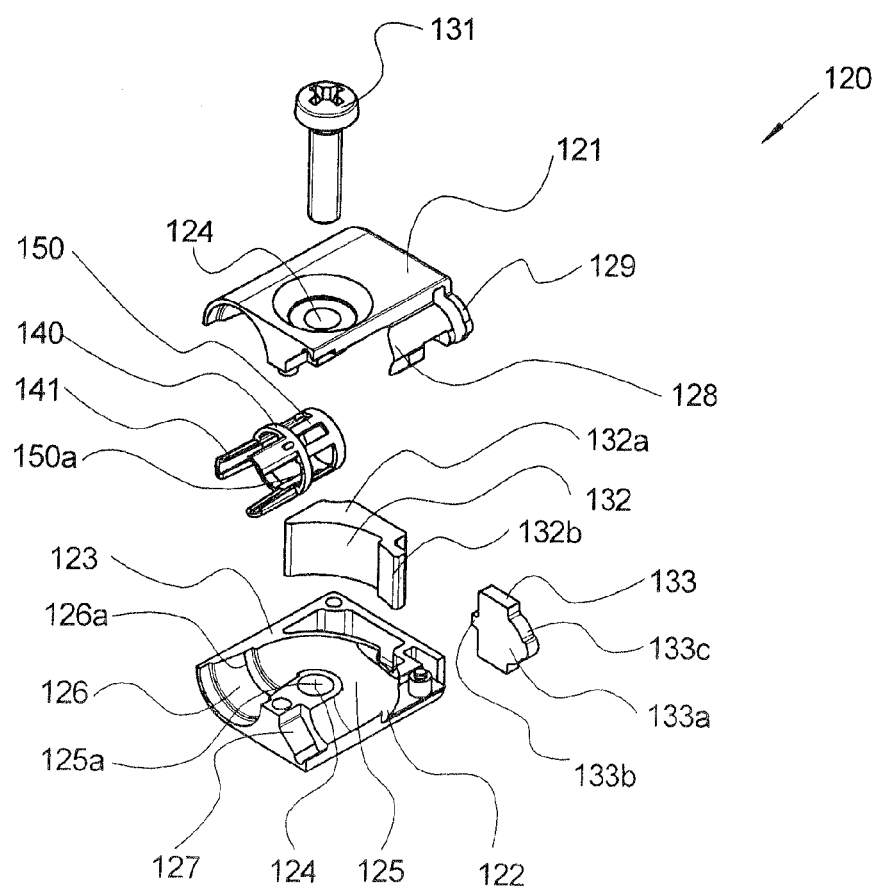
FIG. 7 shows an exploded view of the deflection assembly of the rolling element circuit depicted in FIG. 6.
Figure 9:
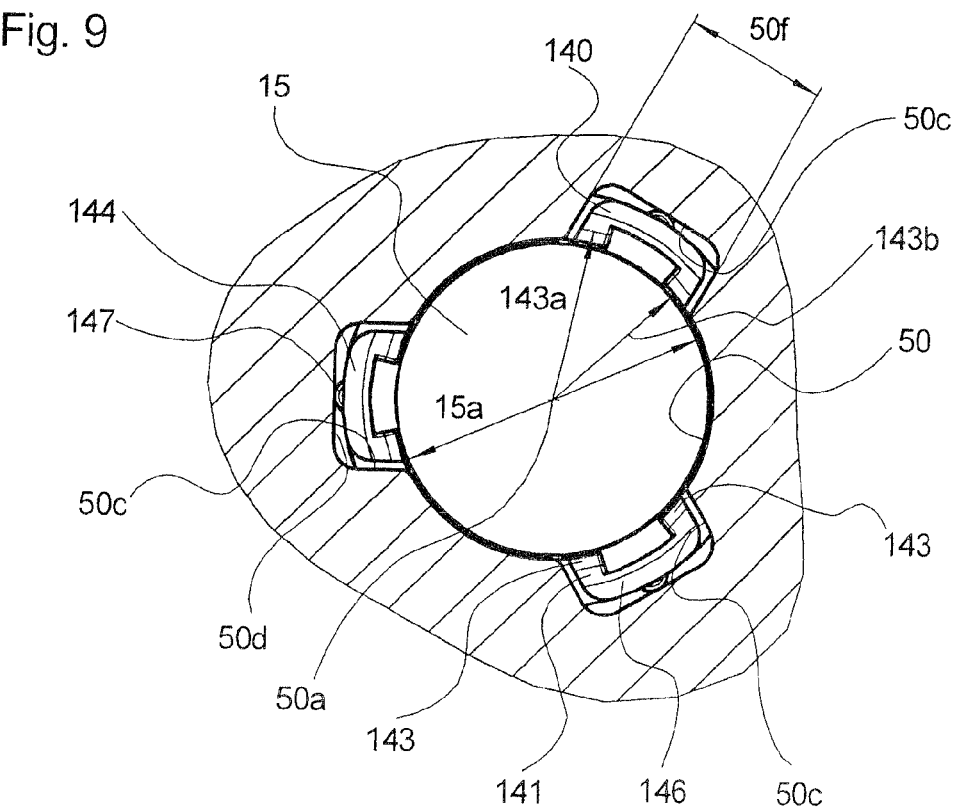
FIG. 9 shows a cross section of a return passage with the transfer part inserted.

A return passage 50, which is manufactured via extrusion without any post-machining, is assigned to every first rolling surface 31. Return channel 50, the cross-sectional shape of which is described in greater detail with reference to FIG. 9, is connected at either end via a curved passage (number 125; FIG. 7) to assigned first rolling surface 31a, thereby enabling rolling elements 15 to circulate endlessly.

First rolling surface part 31, which is shown on the right in FIG. 2, is accommodated on an adjustment section 45 of first body 40, which may be displaced relative to base section 44 of first body 40, on which the fastening means (number 42; FIG. 1) for the lower-order assembly are provided, thereby enabling the preload of the rolling guidance to be adjusted. To this end, adjustment section 45 is connected as a single piece to base section 44 via two flexurally resilient segments 47 that extend in the longitudinal direction. Adjustment section 45 includes an adjusting means in the form of a screw bolt 35 that is screwed into a thread 46 (depicted in a basic schematic manner) of adjustment section 45. Since screw bolt 35 is covered by second assembly 60, an opening (number 43, FIG. 1) is provided in the latter, thereby enabling screw bolt 35 to be adjusted, e.g., using an Allen key. End face 35*a* of the screw bolt bears via a separate rectangular steel strip 34 against base section 44. Steel strip 34 is needed to prevent screw bolt 35 from plastically deforming the soft aluminum of first body 40, which would result in a reduction in the preload on rolling elements 15. The aforementioned flexurally resilient segments 47 are each situated parallel to U-legs 72 of second assembly 60, and the screw axis of screw bolt 35 is oriented perpendicular thereto, thereby providing an adjustment device that is suitable for adjusting the preload.

It is also pointed out that first body 40 is situated opposite to second body 70 with slight equidistant clearance, thereby resulting in a narrow sealing gap 19 between them that prevents foreign objects from entering the space between these parts. In particular, foreign objects should be prevented from reaching rolling elements 15 since this may cause damage if the foreign objects enter the space between rolling elements 15 and assigned rolling surfaces 31*a*; 61*a*. To make it even more difficult for foreign objects to enter, sealing gap 19 is provided with a direction change 20 starting at outer surface 14 of linear motion device 10. Reference is also made here to reinforcing rib 78 on second body 70, which is used to increase the bending resistance of second body 70. Reinforcing rib 78 engages in rib recess 52 in first body 40, and so aforementioned narrow sealing gap 19 is also present in this region.

FIG. 2 also shows the T-shaped cross section of undercut sensor groove 41. Reference is likewise made to push tube 80 which will be described in greater detail with reference to FIG. 5. Push tube 80 is accommodated with slight clearance in a nut recess 56 of first body 40.

Figure 3:
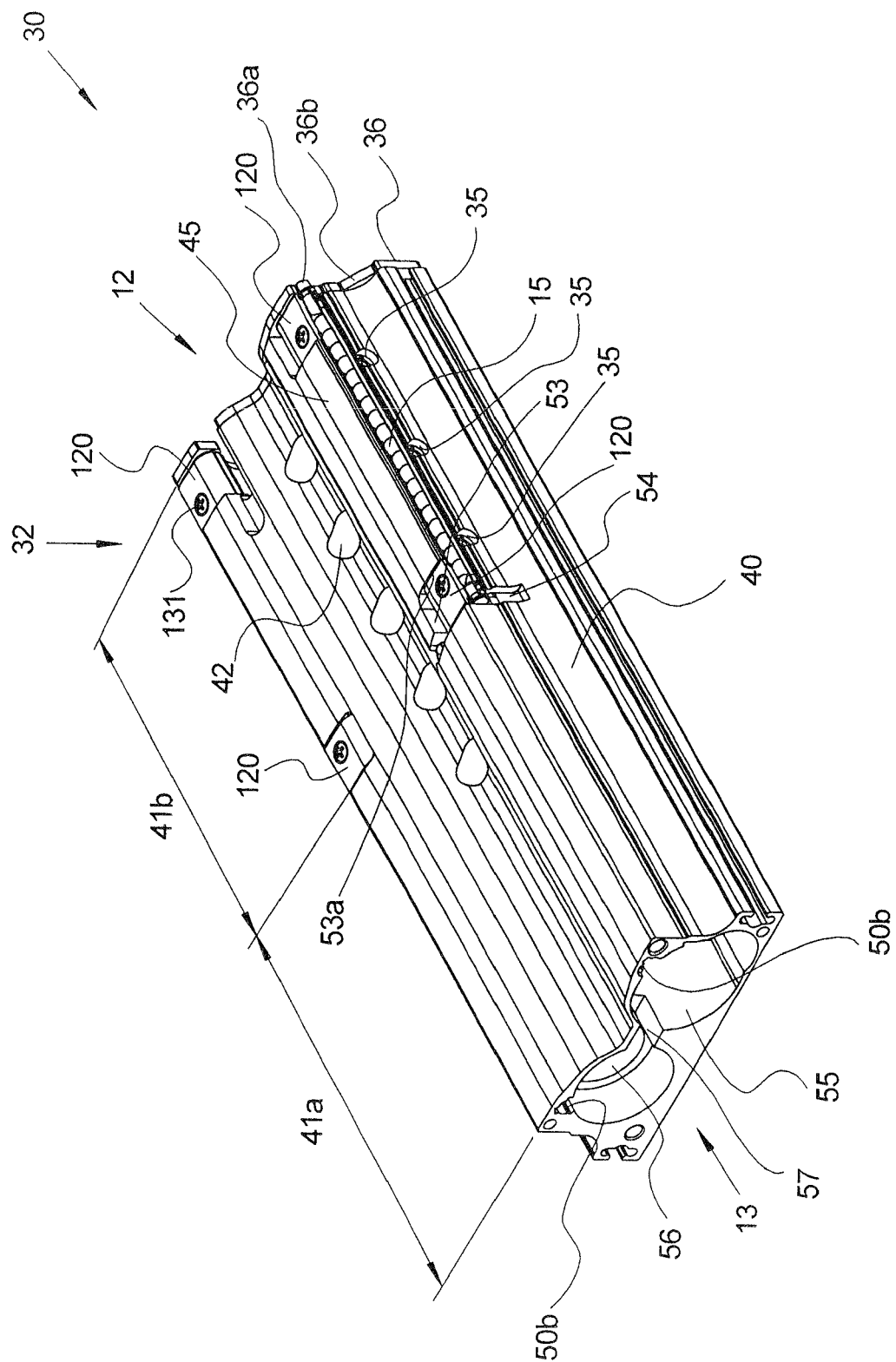
FIG. 3 shows a perspective view of the first assembly of the linear motion device depicted in FIG. 1.

FIG. 3 shows first assembly 30. First body 40 of first assembly 30 is divided into a first longitudinal section 40*a* and a second longitudinal section 40*b* which abut one another directly. Endlessly circulating rolling elements 15 described above are located in second longitudinal section 40*b* which is located on front end 12 of first assembly 30. FIG. 3 shows, in particular, the four circulatory assemblies 120, each of which includes a single, curved deflection passage (number 125; FIG. 7) which connects assigned first rolling surface (number 31*a*; FIG. 2) to assigned the return passage (number 50; FIG. 2). Deflection assemblies 120, which are identical in design, are configured such that they may be installed from a single installation side 32, and the related fastening contours 53 in first body 40 may also be created exclusively from installation side 32. Installation side 32 is the top side—as shown in FIG. 3—of first assembly 30. A deflection recess 53, which is formed using an end mill, is provided for each deflection assembly, as the fastening contour in first body 40. It should be noted here that the return passage (number 50; FIG. 2) extends along the entire length of the extruded raw part; the remainder 50*b* of the return passage, which does not perform a function in first longitudinal section 40*a* of first body 40, is shown in FIG. 2. Each of the four deflection assemblies 120 is fastened to first body 40 using a single screw bolt 131 which may also be screwed in from aforementioned installation side 32, and the assigned threaded bore may likewise be tapped from installation side 32. This embodiment of the rolling element return makes it possible to use one design of deflection assembly 120 in many different designs of linear motion devices 10.

Above-described adjustment section 45 of first body 40 is located on the right side in FIG. 3. It is shown, in particular, that three screw bolts 35 are provided for used to adjust the preload on the rolling elements. Transverse slot 54 and longitudinal slot (number 165; FIG. 2) are used to separate adjustment section 45 from base section 44 of first body 40, thereby ensuring that its adjustment motion is not hindered.

Figure 5:
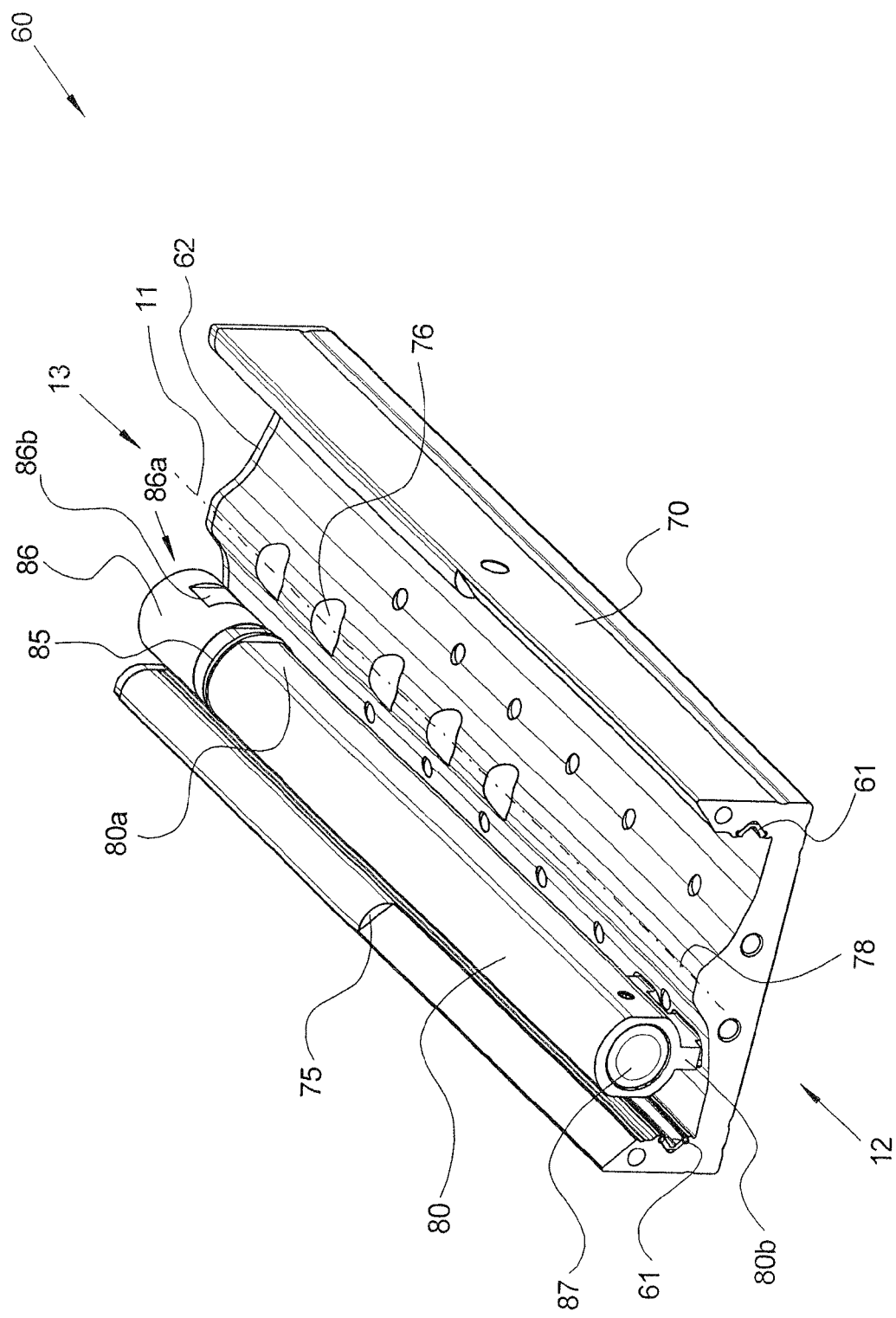
FIG. 5 shows a perspective view of the second assembly of the linear motion device depicted in FIG. 1.

A separate closing plate 36, which is composed of steel sheet, is provided on front side 12 of first assembly 30. Closing plate 36 is designed to have slight, equidistant clearance from the second body (number 70; FIG. 2). Reference is made to stop section 36*b* of closing plate 36, which partly extends beyond first body 40, thereby enabling it to function as an end stop for the second assembly. To this end, a stop surface (number 79; FIG. 5) is provided on the second body, which extends transversely to the longitudinal direction, thereby ensuring that it may come to bear against stop section 36*b*. The stop surface is created by milling the end faces of the U-legs of the raw part of the first body accordingly. Reference is likewise made to stripper projection 36*a* which is adapted to the second rolling surface (number 61*a*; FIG. 2) of second assembly 60 with very little clearance. It is used to remove foreign objects such as metal chips from the second rolling surface, thereby preventing them from entering the rolling element circuit, where they may cause damage.

A motor recess 55 for accommodating the electric motor (number 101; FIG. 4) of the drive assembly is provided in first longitudinal section 40*a* of first body 40. Motor recess 55 is created entirely via milling since the flexurally resilient segments (number 47; FIG. 2) of the adjustment mechanism, which are used to adjust the preload of the rolling guide, are located at this point in the raw part of first body 40. The outer surface, of first body 40 is not machined in first longitudinal section 40*a*, starting at the extruded raw part. This contour therefore had to be milled away in second longitudinal section 40*b* in order to provide the receiving recess (number 48; FIG. 2) in the first rolling surface part.

A nut recess 56 is provided next to motor recess 55, and extends along the entire length of first assembly 30; nut recess 56, together with motor recess 55, forms a drive cavity of the drive assembly (number 90; FIG. 4). Nut recess 56 is used to receive the threaded spindle (number 95; FIG. 4) of the drive assembly, and to receive the assigned push tube (number 80; FIG. 5) of the second assembly. Nut recess 56 and motor recess 55 are located, at least in sections, at the level (number 73; FIG. 2) of the U-legs of the second body, and so the linear motion device has a particularly low overall height.

Motor recess 55 is connected via an air exchange recess 57 to nut recess 56, and all aforementioned recesses are covered by the drive assembly (number 90; FIG. 1) in an air-tight manner. Therefore, the air that is displaced when the second assembly moves inward due to the motion of the nut and the push tube (number 80; FIG. 5) in nut recess 56 flows via air exchange recess 57 into motor recess 55, past the electric motor (number 101; FIG. 4), and via transverse slot 54 to the outside. When the second assembly moves outward, the air flows in the opposite direction. The electric motor is cooled by the air blowing past it, thereby making it possible to use a particularly small electric motor with a high power density.

Figure 3A:
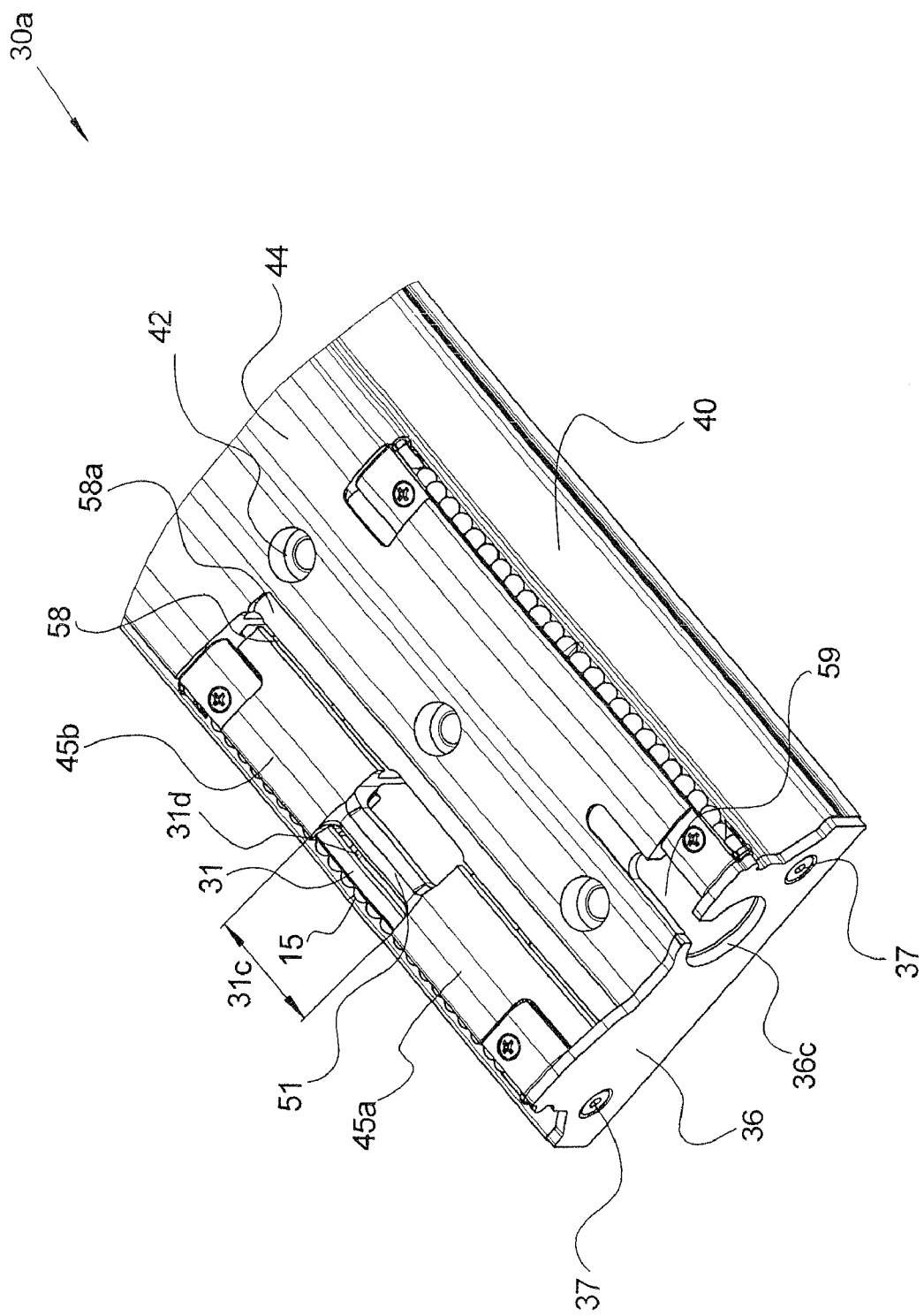
FIG. 3a shows a perspective partial view of a second embodiment of the first assembly depicted in FIG. 3.

FIG. 3a shows a second embodiment 30a of the first assembly. It differs from first embodiment 30 shown in FIG. 3 only in that adjustable, first rolling surface part 31 is not supported via a central longitudinal section 31c on first body 40. This measure was implemented to prevent a backup of the rolling elements due to the relatively long first rolling surfaces. The long length of the first rolling surfaces was selected so that first assembly 30a may stiffly support high torque loads.

Aforementioned central longitudinal section 31c is formed by milling away body 40 nearly entirely in this region, thereby forming a first adjustment section 45a and a second adjustment section 45b—which have clearance between them—of first main body 40. Therefore, there is absolutely no material left in the central longitudinal section 31c behind the first rolling surface part that could support it; a gap 31d therefore exists in central longitudinal section 31c between first rolling surface part 31 and first body 40. Since first rolling surface part 31 has only relatively minor stiffness, rolling elements 15 that roll there are merely subjected to a minor load, thereby enabling them to be displaced in a gliding manner when rolling elements become backed up, thereby immediately eliminating the back-up of rolling elements.

First adjustment section 45a and second adjustment section 45b are connected to one another as a single piece only via return tube 51, in which return passage (number 50; FIG. 2) is located. Since the walls of return tube 51 are relatively thin, return tube 51 has a relative stiffness, thereby enabling first adjustment section 45a and second adjustment section 45b to be adjusted largely independently of one another, in order to adjust the preload of the roller guidance. It has proven favorable to provide first adjustment section 45a and second adjustment section 45b with only one adjustment means each, in the form of a screw bolt, since this makes it possible to adjust the preload in the quickest manner possible.

For the rest, the design of second embodiment 30a of the first assembly is identical to that of first embodiment 30. This applies, e.g., to milled-out dividing section 58a, via which a dividing gap 58 between adjustment section 45; 45a; 45b and base section 44 of first body 40 is formed, thereby ensuring that the adjustment section has the desired adjustability. FIG. 3a also shows fastening screws 37, via which closing plate 36 is fastened to first body 40. Finally, reference is likewise made to tapped bores 42, using which first assembly 30; 30a may be fastened to a higher-order assembly.

FIG. 4 shows drive assembly 90 which may be fastened as a whole to the rear longitudinal end of the first body; gearbox housing (number 91; FIG. 1) is not shown, for clarity. Drive assembly 90 includes electric motor 101 and threaded spindle 95, axes of rotation 95a; 101a of which are oriented parallel to one another. Electric motor 101 and threaded spindle 95 are connected in a rotationally driving manner via an endless toothed belt 94; the smaller, first toothed belt pulley 92 is located on electric motor 101, and the larger, second toothed belt pulley 93 is located on threaded spindle 95. Electric motor 101 is fastened via fastening screws 105 to a motor plate 104. This, in turn, may be fastened in various transverse positions to gearbox housing (number 91; FIG. 1), thereby making it possible to adjust the tension of the toothed belt required during operation by displacing electric motor 101. The appropriate position of motor plate 104 is secured using cylindrical pin 106 which engages in gearbox housing (number 91; FIG. 1) in a form-locked manner. Electric motor 101 is equipped with a rotary encoder 103, the signal of which is forwarded via electrical line 102 to a higher-order control (not depicted). Via electrical line 102, electric motor 101 is also supplied with electric current via higher-order control. Furthermore, electric motor 101 is equipped with a single motor housing 101b, and so the cooling air described above flows between motor housing 101b and motor recess (number 55; FIG. 3). This prevents foreign objects that have been drawn in via the cooling air from reaching the interior of electric motor 101.

Threaded spindle 95 includes a bearing part 97 and a threaded part 96. Threaded part 96 is a section of a ball screw spindle which is manufactured using a thread rolling method, and which is therefore provided with one or more thread turns 95b along its entire length. In thread rolling, threaded spindles having a length of several meters are usually manufactured. They are cut to the desired length to form threaded part 96, without any further machining being performed.

Bearing part 97 is connected to threaded part 96 via a clamping section 97b on bearing part 97, which acts directly on thread turns 95b of threaded part 96. For reasons of cost, thread turns 95b were not removed in the clamping region since sufficient clamping force is attained even without this measure. Clamping section 97b of bearing part 97 includes two clamping jaws that are separated from one another via a slot 97c; a clamping screw 100 extends through slot 97c in order to generate the desired clamping force.

Second toothed belt pulley 93 is designed as a separate component, is composed of aluminum, and is non-rotatably connected to bearing part 97 which is made of steel. Furthermore, a radial deep-groove ball bearing 98 is provided on bearing part 97, and is fixedly clamped to bearing part 97 via its inner ring using a groove nut 99. Outer ring 98a of radial roller bearing 98 is secured in the gearbox housing (number 91; FIG. 1). Threaded spindle 95 is equipped with only one pivot bearing. Accordingly, the present radial roller bearing is designed to include two rows, thereby ensuring that it has the required loadability. Segment 97a remaining on bearing part 97 may be used, e.g., to install a brake, using which threaded spindle 95 may be brought to a standstill.

FIG. 5 shows second assembly 60 in the form of the table part; the fastening part (number 82; FIG. 1), which is located on front longitudinal end face 12 of second body 70, is not shown, for clarity. Second assembly 60 includes second body 70 which extends via a U-shaped cross section in longitudinal direction 11. Furthermore, second assembly 60 includes a push tube 80 which is designed separate from second body 70 and includes a connecting segment 80b which is formed as a single piece therewith, and via which it is screwed to second body 70. In the rearmost position of second assembly 60, connecting segment 80b, which is provided on the front longitudinal end of push tube 80, engages in segment recess (number 59; FIG. 3a) of the first assembly, and push tube 80 simultaneously extends through its push tube opening (number 36c; FIG. 3a). Push tube 80 is composed of aluminum and is manufactured via extrusion; the front, end-face opening of push tube 80 is closed using a separate stopper 87 which is composed of plastic.

A threaded nut 86 in the form of a recirculating ball nut is mounted on rear longitudinal end 13 of the push tube, and is engaged in screw-type manner with the threaded spindle (number 95; FIG. 4) of the drive assembly. Threaded nut 86 is designed as a screw-in nut, i.e., it includes an internal thread on its front end, which is screwed onto a corresponding external thread on push tube 80. To ensure that the tightening torque of the screw connection is sufficient, threaded nut 86 and push tube 80 are each provided with a pair of opposing key surfaces 86b; 80a.

Furthermore, a gap seal 85, which is accommodated in a circumferential groove of push tube 80, is provided on rear end 13 of push tube 80. Gap seal 85 is interrupted only once in the circumferential direction, thereby enabling it to be easily installed on push tube 80. The purpose of gap seal 85 is to seal the nut recess (number 56; FIG. 3) at this point in a substantially air-tight manner in order to generate the above-described cooling-air flow. Gap seal 85 therefore bears substantially tightly against the nut recess.

Threaded nut 86 is provided with a known end seal 86a, which bears against the threaded spindle (number 95; FIG. 4) only on the side facing away from the push tube. Threaded nut 86 is open on the opposite end, thereby resulting in a connection to the interior of push tube 80, which is filled with lubricating grease. In this manner, it is ensured that threaded nut 86 will be lubricated throughout its entire service life.

FIG. 5 also shows that reinforcing rib 78 and second rolling surface parts 61 extend along the entire length of second assembly 60. A longitudinal displacement of second rolling surface parts 61 in assigned receiving recess (number 74; FIG. 2) is prevented by stripper plate 62 and the fastening plate (number 82; FIG. 1).

Figure 6:
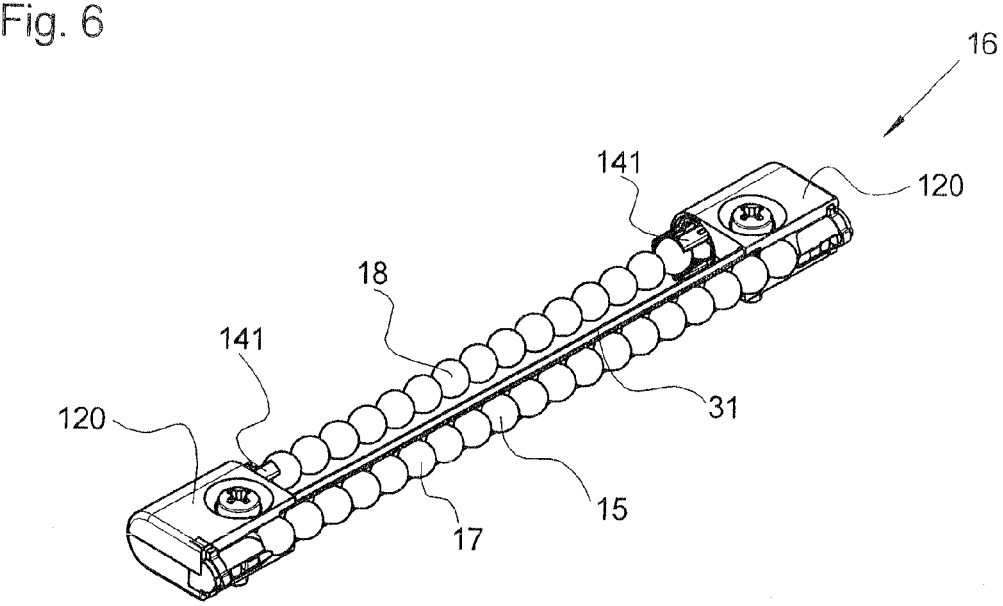
FIG. 6 shows a perspective view of a rolling element circuit without the enclosing first assembly.

FIG. 6 shows a rolling element circuit 16; the enclosing first assembly is not shown, for clarity. Rolling element circuit 16 encloses a row of spherical rolling elements 15, which is configured in the form of an endless loop. Load-bearing rolling elements 17 shown at the front in FIG. 6 roll on first rolling surface part 31 which engages via each of the two ends in a deflection assembly 120, in each of which one curved deflection passage (number 125; FIG. 7) is provided. For this purpose, every first rolling surface part 61 must extend past the first body (number 40; FIG. 3) in the longitudinal direction at both ends. Returning rolling bodies 18 shown at the rear in FIG. 6 roll in the return passage (number 50; FIG. 2) which is provided directly in the first body of the first assembly. To attain the best possible orientation between a deflection passage 120 and the assigned return passage, the former are provided with finger-type extensions 141 that engage in the return passage.

FIG. 7 shows an exploded view of deflection assembly 120. Deflection assembly 120 includes a first deflection part 121, and a second deflection part 122, which is composed of plastic; deflection parts 121 and 122 are designed largely as mirror-images relative to parting plane 123. Deflection parts 121; 122 both limit curved deflection passage 125 which connects the first rolling surface (number 31a; FIG. 2) to the return passage (number 50; FIG. 2). Curved deflection passage 125 has a circular cross-sectional shape that is sized such that the spherical rolling elements may pass through it with minimal play.

A lifting projection 128, via which the rolling elements are lifted away from the first rolling surface and transferred to the curved deflection passage, is provided on the end of curved deflection passage 125 that is assigned to the first rolling surface. Lifting projection 128, which is known per se, is formed exclusively on first deflection part 121, thereby enabling it to be situated at a particularly close distance to the first rolling surface. The position of deflection assembly 120 relative to the first rolling surface is defined via orientation recess 127, into which the corresponding first rolling surface part engages. One half of orientation recess 127 is provided on first deflection part 121, and the other half is provided on second deflection part 122, and each half is assigned to a V-leg (number 31e; 31f in FIG. 11) of the first rolling surface part.

Figure 8:
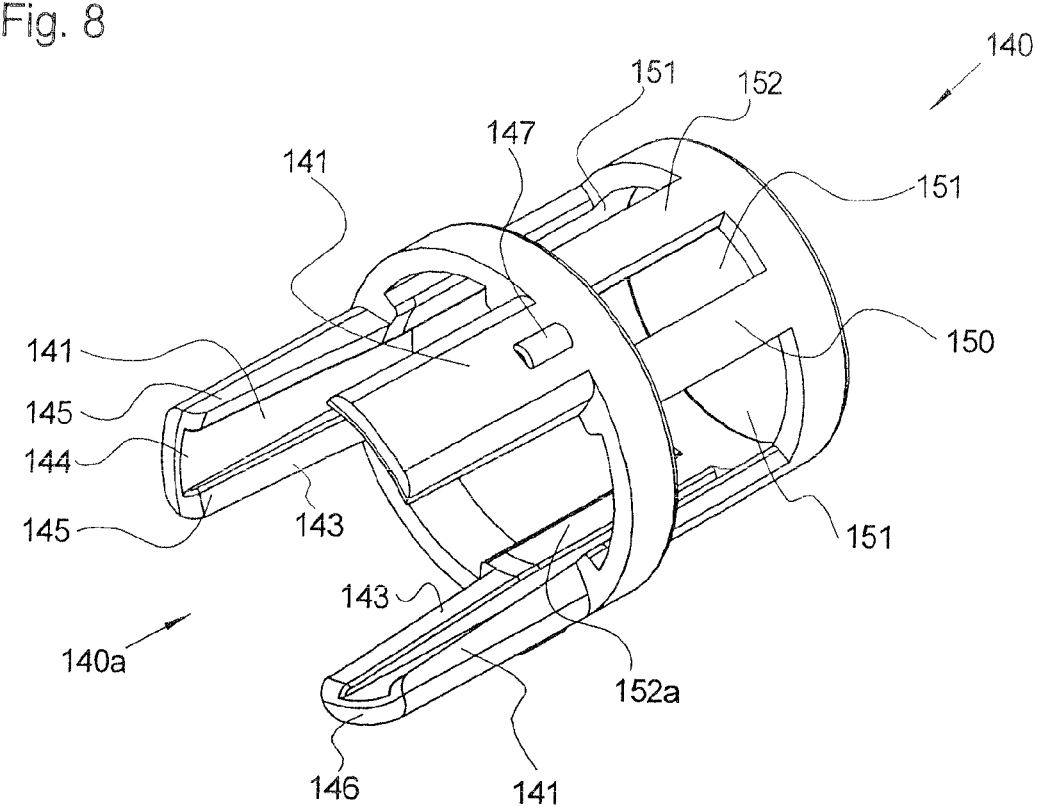
FIG. 8 shows a perspective view of the transfer part depicted in FIG. 7.

A separate transfer part 140, which is composed of plastic and will be described in greater detail with reference to FIGS. 8 and 9, is provided on the end of the curved deflection passage assigned to the return passage. Transfer part 140 is accommodated in a conical recess 126, the smallest diameter 126a of which is adapted to the assigned section of transfer piece 140 substantially without play. Due to the conical shape of aforementioned recess 126, some open space is available to flexible tube 150 of transfer part 140 in the transverse direction, thereby enabling it to bend accordingly in order to compensate for displacement between curved deflection passage 125 and the return passage. For this purpose, it engages via three finger-type extensions 141 into the adapted grooves (number 50c; FIG. 9) of the return passage. Transfer part 140 bears via end face 150a of flexible tube 150 against an assigned end face (number 53a; FIG. 3) of the first body, and so it is retained substantially without play in conical recess 126.

An opening 124 is formed in center of curvature 125a of the curved deflection passage in first deflection part 121 and in second deflection part 122, through which a fastening bolt 131 in the form of a screw bolt extends. In this manner, deflection parts 121; 122 are fixedly interconnected, and entire deflection assembly 120 is fastened to the first body. Instead of screw bolt 131, a blind rivet or a similar fastening bolt may be used, for instance, which may be installed exclusively from one side, namely the installation side (number 32; FIG. 3).

Furthermore, a lubricating system is provided in deflection assembly 120, which is formed of a first lubricating oil storage body 132 and a second lubricating oil storage body 133 which are composed of an open-cell foam. Lubricating oil storage bodies 132; 133 are each cut out of a panel-type material via water-jet cutting, and so they have the shape of a profiled element having a substantially constant cross section 132a; 132b. First lubricating oil storage body 132 has the larger volume, which is why it provides the majority of the storage volume for the lubricating oil. An application section 132b is formed as a single piece on first lubricating oil storage body 132, and extends into curved deflection passage 125, and so the rolling elements passing by run along it, by way of which lubricating oil is transferred from first lubricating oil storage body 132 to the rolling elements.

Second lubricating oil storage body 133 glides directly along the first rolling surface, thereby lubricating it and removing small dirt particles from it. The outer contour of stripper section 133c of second lubricating oil storage body 133 is adapted exactly to the cross-sectional profile of the first rolling surface. Cross-sectional planes 132a; 133a of first and second lubricating oil storage bodies 132; 133 are oriented perpendicularly to one another; second lubricating oil storage body 133 includes a projection 133b, via which it touches the first lubricating oil storage body, thereby enabling lubricating oil to be transferred from the first lubricating oil storage body to the second lubricating oil storage body. The intention is to distribute the entire stored quantity of lubricating oil onto the two lubricating points as needed. This may be attained by sizing aforementioned projection 133b in a suitable manner, in particular its contact faces to first lubricating oil storage body 132. Reference is likewise made to stripper plate 129, via which the relatively thin, second lubricating oil storage body is supported against bending. Stripper plate 129 is formed at a slight, equidistant distance from the first rolling surface, and, similar to lifting projection 128 which likewise supports the second lubricating oil storage body against bending, is formed entirely on first deflection part 121. Stripper plate 129 may also remove larger foreign objects from the first rolling surface, provided this has not already been done by the stripper projection (number 36a; FIG. 3) of the closing plate.

FIG. 8 shows transfer part 140 in a greatly enlarged view. Transfer part 140 is designed as a single piece, and is made of plastic using an injection-molding procedure. Transfer part 140 includes a flexible tube 150 that has a substantially circular cross-sectional shape, on the front end of which three identical finger-type extensions 141 are located equidistantly around the circumference of bendable tube 150. Finger-type extensions 141 have a U-shaped cross-sectional shape along their entire length, and they include a base 144 from which two U-legs 145 each extend at right angles. The end faces of the U-legs form guide surfaces 143 for the spherical rolling elements that pass through transfer part 140. The length of U-legs 145 increases from the free end of finger-type extensions 141 toward the flexible tube, and so aforementioned guide surfaces 143 are slanted relative to the course of the return passage. It should be noted that base 144 of finger-type extensions 141 is oriented parallel to the return passage, and it bears via a contact projection 147 directly against the base of the assigned groove (number 50c; FIG. 9) in the return passage. Reference is made to the embodiments described with reference to FIG. 9 in terms of the exact placement of guide surfaces 143 relative to the return passage.

Flexible tube 150 is provided with a total of six windows 151 in order to increase its flexural elasticity. The flexible tube therefore forms a flexible passage 140a for the rolling elements, via which a possible displacement between the return passage and the curved deflection passage may be compensated for. Segments 152 formed between windows 151 are extensions of U-legs 145 of finger-type extensions 141, and so guide surfaces 143 provided there for the rolling elements may be continued without interruption on segments 152a.

FIG. 9 shows a cross section of a return passage 50 with transfer part 140 inserted. Return passage 50 has a substantially circular cross-sectional shape that is adapted to rolling elements 15 with slight play. Three grooves 50c are distributed equidistantly around the circumference of return passage 50. Grooves 50c extend along the entire length of return passage 50 since it and grooves 50c are created during the extrusion of the first body, and they are not machined further. One finger-type extension 141 of deflection part 140 is accommodated in each of the grooves 50c; grooves 50c are designed to have slight clearance from finger-type extension 141. A contact projection 147 which bears against base 50d of groove 50c is provided on base 144 of each finger-type extension 140. Grooves 50c and contact projections 147 are matched to one another such that transfer part 140 is accommodated in return passage 50 with slight preload. Width 50f of grooves 50c is approximately 40% of ball diameter 15a, and so rolling elements 15 are still guided adequately in return passage 50 at a distance from grooves 50c.

Guide surfaces 143 for rolling elements 15 are shown with their slanted course in FIG. 9. The front end of each guide surface is situated so far way 143a from central axis 50a of return passage 50 that it is ensured to be recessed in groove 50c. It is therefore ruled out that rolling elements 15 that approach from return passage 50 and enter the curved deflection passage may collide with end face 146 of finger-type extensions 141.

The rear end of the guide surfaces on the finger-type extensions is situated so far away 143b from central axis 50a of return passage 50 that it extends out of assigned groove 50c by a small amount. It is therefore ruled out that rolling elements 15 that approach from the curved deflection passage and enter return passage 50 may collide with the end face of the first body (number 53a; FIG. 3). The aforementioned slight overhang is difficult to see due to its small size in FIG. 9 which is drawn to scale.

Figure 10:
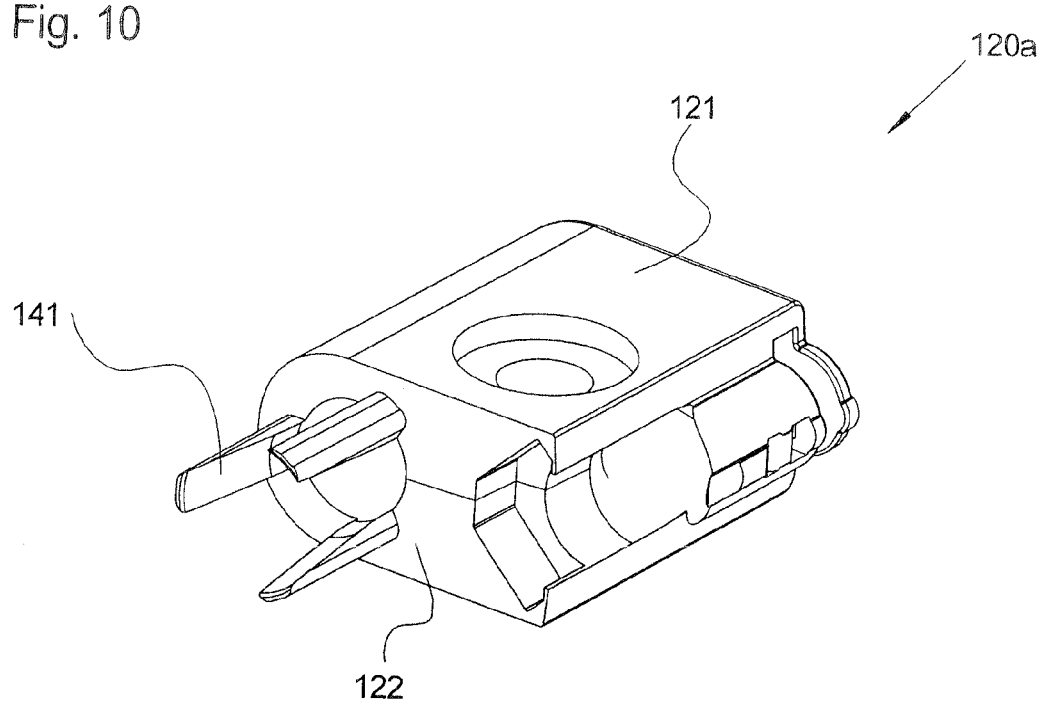
FIG. 10 shows a perspective view of a second embodiment of the deflection assembly.

FIG. 10 shows a second embodiment of deflection assembly 120a, in which, in contrast to first embodiment 120 shown in FIG. 9, finger-type extensions 141 are designed as a single piece with first deflection part 121 and second deflection part 122. The separate transfer part is therefore eliminated in this embodiment, and so second embodiment 120a is slightly more cost-favorable than first embodiment 120, although the advantages of the flexible passage (number 140a; FIG. 8) must be foregone. First embodiment 120 of the deflection assembly, which is otherwise identical to second assembly 120a, is preferred due to its advantages.

Figure 11:
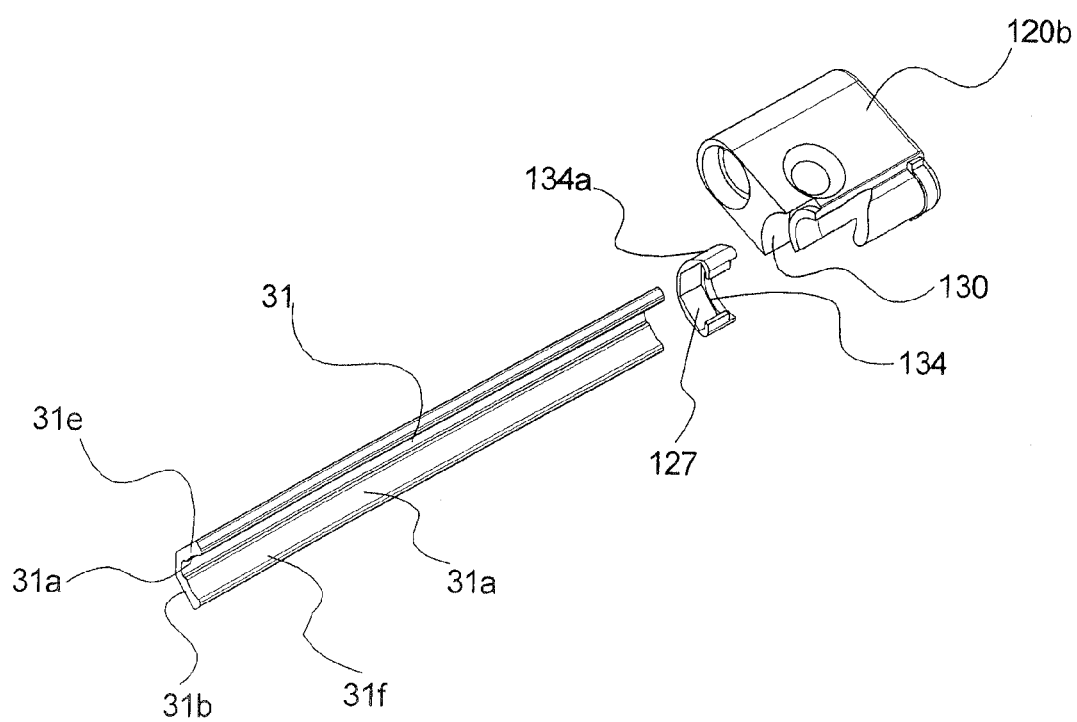
FIG. 11 shows an exploded view of a third embodiment of the deflection assembly.

FIG. 11 shows a third embodiment 120b of the deflection assembly, in which first rolling surface part 31 is rotatably accommodated in deflection assembly 120b. To this end, deflection assembly 120b includes a separate holding part 134, in which orientation recess 127 for the first rolling surface part is provided. As in all other embodiments of the deflection assembly, rolling surface part 31 is designed as a profiled element having a constant cross-sectional shape, and flat longitudinal end faces 31b are provided on both ends of the first rolling surface part. The cross-sectional shape of first rolling surface part 31 is substantially V-shaped, having a first V-leg 31e and a second V-leg 31f. On the outside, holding part 134 is provided with a circular-cylindrical surface 134a, the longitudinal axis of which extends through the midpoint of the spherical rolling elements. Circular-cylindrical surface 134a bears against a modified surface 130 of remaining deflection assembly 120b, and so first rolling surface part 31 is rotatable about the midpoint of the rolling elements relative to deflection assembly 120b. Via this measure, the same design of deflection assembly 120b may be used in various designs of linear motion devices. The purpose of the rotatability described above is to account for the different spacial conditions in the various linear motion devices. Nevertheless, first embodiment 120 of the deflection assembly, which is otherwise identical to third embodiment 120b of the deflection assembly, is preferred due to its ease of manufacture.

Figure 12:
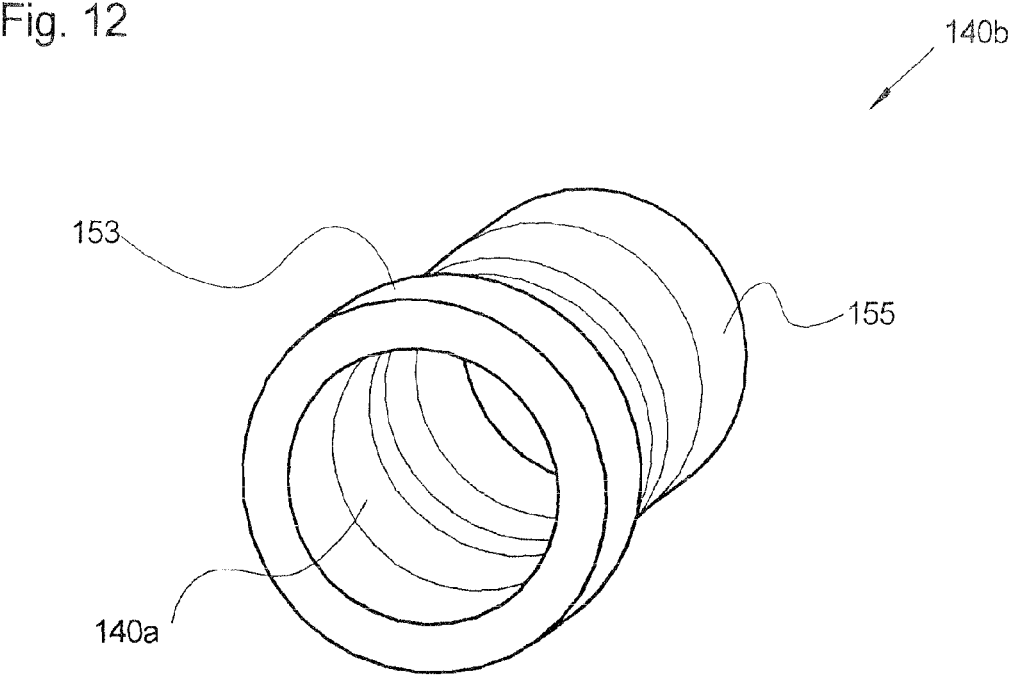
FIG. 12 shows a perspective view of a second embodiment of the transfer part.
Figure 13:
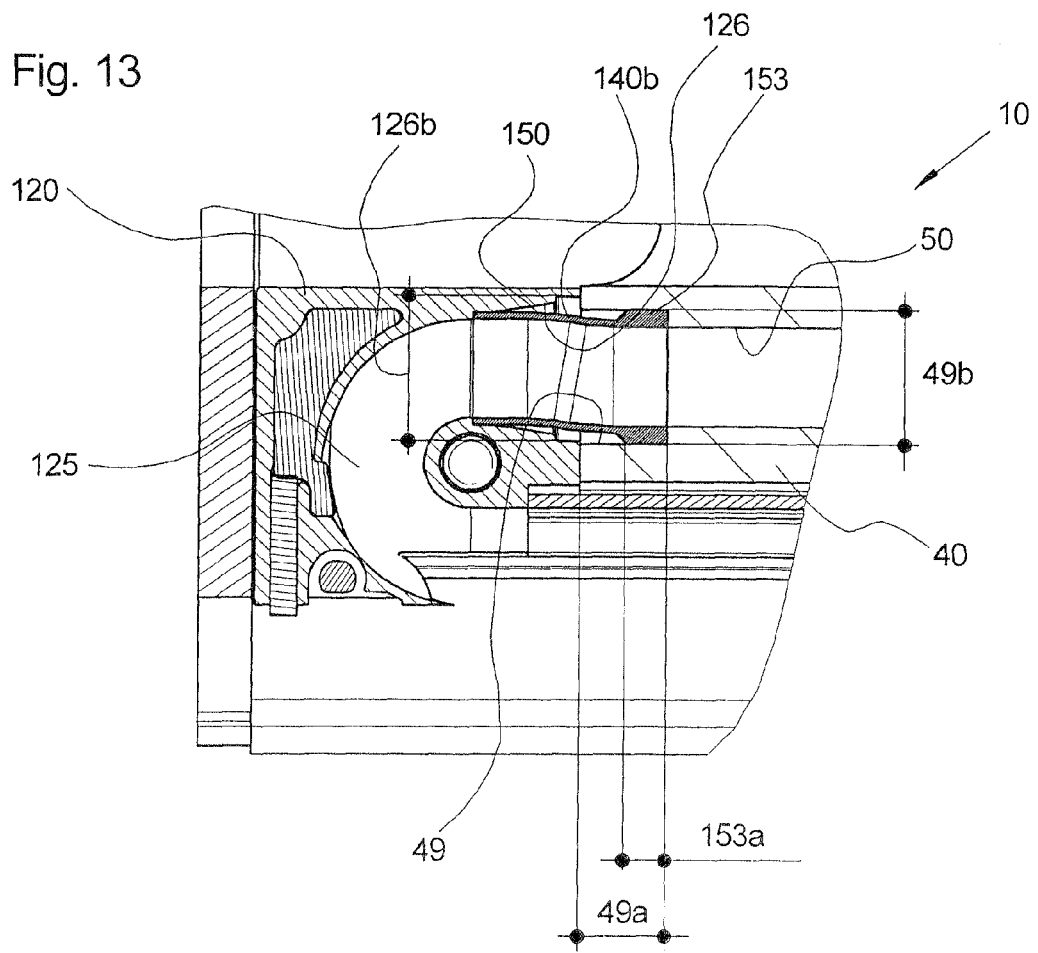
FIG. 13 shows a longitudinal cross-section of the linear motion device in the region of the transfer part depicted in FIG. 12.

FIG. 12 shows a perspective view of a second embodiment of transfer part 140b, in which the deformed state according to FIG. 13 is shown. In the non-deformed state, transfer part 140b is rotationally symmetrical. It includes a thin-walled, circular-cylindrical, closed tube 155, on the end of which a radial ridge 153 is provided, the outer circumferential surface of which is also circular-cylindrical in shape. The inner surface of thin-walled tube 155 forms flexible passage 140a. Transfer part 140b is composed of plastic, and is manufactured using an injection-molding procedure.

FIG. 13 shows transfer part 140b in the installed state. Deflection assembly 120 is designed in accordance with the first embodiment which was described above extensively with reference to FIG. 7, and so it will not be described again here. In terms of return passage 50, the grooves that extend in the longitudinal direction were eliminated, and so it has a circular cross section. Instead, a recess 49, which is adapted to radial ridge 153 of transfer part 140b, is provided on the end of first body 40. Recess 49 is also circular-cylindrical in design and has the same diameter 126b as radial ridge 153. Depth 49a of recess 49 is greater than width 153a of radial ridge 153, and so flexible tube 150 has a long length and therefore sufficient elasticity.

FIG. 13 shows a case of installation in which a particularly great alignment error exists between deflection passage 125 and return passage 50. The bending-related deformation of flexible tube 150 is therefore particularly great. Nevertheless, no notable interferences that could create noise exist in the path of spherical rolling elements.

It is also pointed out that opening width 126b of conical recess 126 is greater than opening width 49b of recess 49. This measure serves to compensate for the alignment error between recesses 126; 49 which are directly opposite one another.

Figure 14:
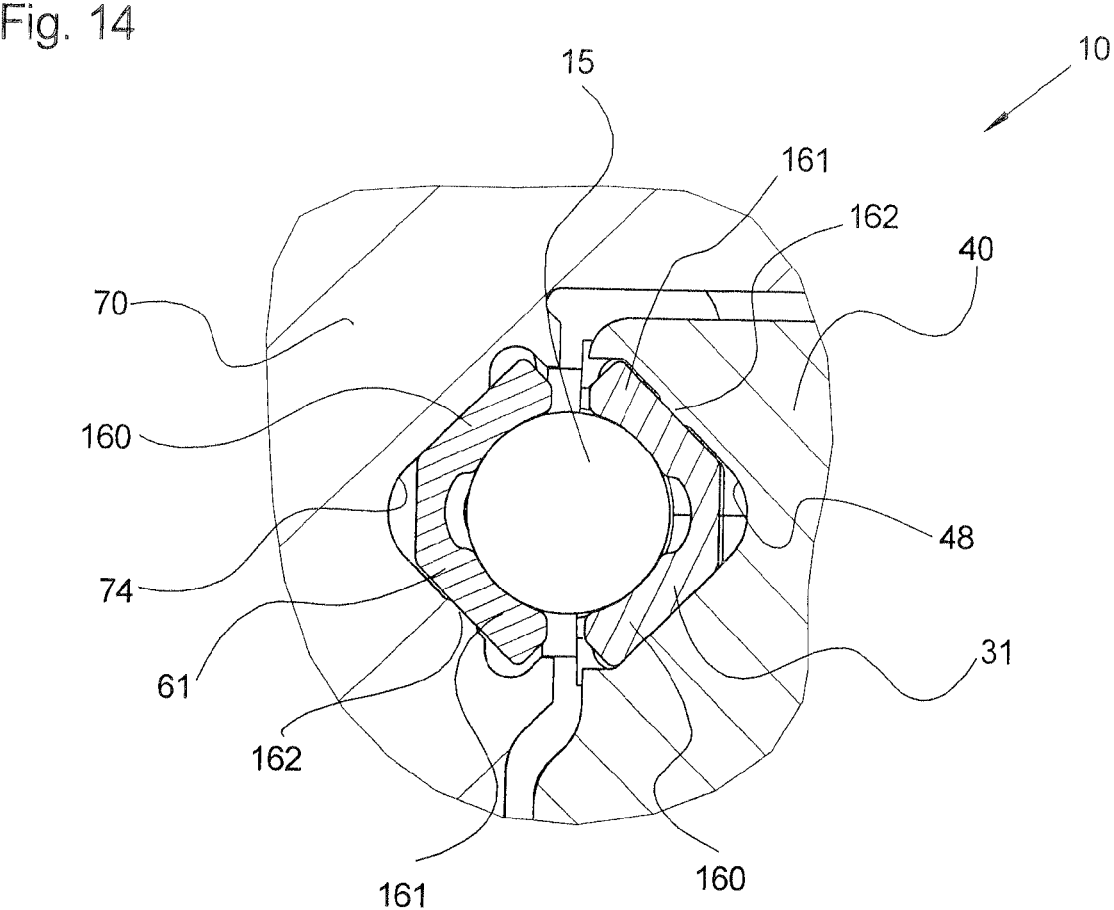
FIG. 14 shows a cross-sectional view of the linear motion device in the region of the first and second rolling surface parts.

FIG. 14 shows a cross section of linear motion device 10 in the region of the first and second rolling surface parts 31; 61. In particular, the figure shows the formation of the placement geometry of first rolling surface part 31 on first body 40, and of second rolling surface part 61 on second body 70; the aforementioned geometries are substantially point-symmetrical about the midpoint of rolling elements 15. Substantially V-shaped rolling surface parts 31; 61 bear via a first leg 160 in each case and via their entire area against assigned body 40; 70; an approximately linear contact between rolling surface parts 31; 61 and assigned bodies 40; 70 is provided on second leg 161. For this purpose, a narrow extension 162 is formed on each body 40; 70, each of which extends along the entire length of assigned rolling surface part 31; 61. Rolling surface parts 31; 61 bear via their flat back sides against extension 162. The purpose of this measure is to compensate for deviations in terms of shape between receiving recesses 48; 74 and assigned rolling surface parts 31; 61. In particular, the aim is for rolling surface parts 31; 61 to bear against assigned body 40; 70 in a predictable manner even under unfavorable tolerance conditions, so that rolling elements 15 run along the entire length of rolling surface parts 31; 61 under a substantially constant preload.

It will be understood that each of the elements described above, or two or more together, may also find a useful application in other types of constructions differing from the types described above.

While the invention has been illustrated and described as embodied in a linear motion device comprising a deflection assembly having a single deflection passage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A linear motion device, comprising a first assembly and a second assembly which is linearly movable relative to the first assembly, in which at least one first rolling surface which extends in a longitudinal direction is provided on the first assembly, the first rolling surface being located opposite a second rolling surface provided on the second assembly, and in which a row of rolling elements is located between the first rolling surface and the second rolling surface, and in which a return passage that is substantially parallel to the first rolling surface is provided in the first assembly, the return passage being connected at either end via a curved deflection passage to the first rolling surface such that the rolling elements are transferred, thereby enabling the rolling elements to circulate endlessly, and in which the first assembly includes at least one deflection assembly that is installed as a whole, and that includes a single deflection passage, wherein the return passage is provided directly and completely in a separate first body of the first assembly, and the deflection assembly is fastened to the first body via a single, separate fastening bolt that is installable via one side, the fastening bolt being located in a region of a center of curvature of the assigned, curved deflection passage.

2. The linear motion device as recited in claim 1, wherein the deflection assembly includes a first deflection part and a second deflection part, a parting plane of which is defined by a midpoint trajectory of the rolling elements in the deflection passage; the fastening bolt extends through both deflection parts and is situated perpendicularly to the parting plane.

3. The linear motion device as recited in claim 2, wherein the first rolling surface is provided on a separate, first rolling surface part that is supported on the first body, the first rolling surface part extending in the longitudinal direction beyond the first body and thereby engaging in the first deflection part and the assigned second deflection part.

4. The linear motion device as recited in claim 3, wherein the rolling elements are balls, and the first rolling surface part has a V-shaped cross section that includes a first V-leg and a second V-leg, the first V-leg engaging in the first deflection part, and the second V-leg engaging in the second deflection part.

5. The linear motion device as recited in claim 2, wherein at least one separate, first lubricating oil storage body is provided that has a constant cross-sectional shape, and is enclosed by the first deflection part and the assigned second deflection part, the first lubricating oil storage body extending via at least one application section into the assigned deflection passage, thereby enabling it to establish lubricating contact to the rolling elements.

6. The linear motion device as recited in claim 5, wherein the first lubricating oil storage body is directly connected to a separate, second lubricating oil storage body in a lubricant-transferring manner, the second lubricant storage body having a constant cross-sectional shape that is adapted to a cross-sectional shape of the second rolling surface, and that touches the second rolling surface; cross-sectional planes of the first and second lubricating oil storage bodies are oriented perpendicularly to one another.

7. The linear motion device as recited in claim 6, wherein a stripper plate is formed as a single piece exclusively with the first deflection part, and is situated with equidistant clearance from the second rolling surface, the stripper plate supporting the second lubricating oil storage body against bending.

8. The linear motion device as recited in claim 6, wherein a lifting projection is formed as a single piece exclusively with the first deflection part, on which the rolling elements are lifted off of the second rolling surface and transferred to the assigned deflection passage.

9. The linear motion device as recited in claim 1, wherein the deflection assembly is accommodated in a deflection recess located on a side of the first body, the deflection recess being adapted to the deflection assembly such that the deflection assembly is substantially entirely prevented from rotating.

10. The linear motion device as recited in claim 1, wherein a separate transfer part engages in the curved deflection passage and in the adjacent return passage, the transfer part including a deformable passage that connects the deflection passage to the return passage.

* * * * *